(12) United States Patent
New et al.

(10) Patent No.: US 8,108,602 B2
(45) Date of Patent: *Jan. 31, 2012

(54) LOG-STRUCTURED FILE SYSTEM FOR DISK DRIVES WITH SHINGLED WRITING

(75) Inventors: Richard M. H. New, San Jose, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 26 days.

This patent is subject to a terminal disclaimer.

(21) Appl. No.: 12/959,771

(22) Filed: Dec. 3, 2010

(65) Prior Publication Data

US 2011/0075292 A1  Mar. 31, 2011

Related U.S. Application Data

(63) Continuation of application No. 10/674,081, filed on Sep. 29, 2003, now Pat. No. 7,996,645.

(51) Int. Cl.
*G06F 12/00* (2006.01)
(52) U.S. Cl. ............ 711/112; 711/4; 711/170; 711/201
(58) Field of Classification Search .................. 711/5, 6, 711/114, 127, 157
See application file for complete search history.

(56) References Cited

U.S. PATENT DOCUMENTS

| 5,537,588 | A | * | 7/1996 | Engelmann et al. | .......... 711/144 |
| 6,266,739 | B1 | * | 7/2001 | Johnson | .......... 711/112 |
| 2003/0197968 | A1 | * | 10/2003 | Sacks et al. | .......... 360/75 |
| 2003/0198153 | A1 | * | 10/2003 | Van Den Enden | .......... 369/47.4 |

* cited by examiner

*Primary Examiner* — Reginald Bragdon
*Assistant Examiner* — Gurtej Bansal
(74) *Attorney, Agent, or Firm* — John L. Rogitz

(57) ABSTRACT

Data is written to a hard disk drive using shingled writing principles, i.e., each data track is partially overwritten when an immediately contiguous data track is written. One or more contiguous data tracks establish a band, and a band establishes a respective segment in a log-structured file system.

23 Claims, 2 Drawing Sheets

| sector # | virtual sector location | actual sector location |
|---|---|---|
| 1 | location A — 60 | 62 — location A' |
| 2 | location B | location B' |
| 3 | location C | location C' |
| ⋮ | ⋮ | ⋮ |

Figure 4 - VAT

LOG-STRUCTURED FILE SYSTEM FOR DISK DRIVES WITH SHINGLED WRITING

This is a continuation of and claims priority to U.S. patent application Ser. No. 10/674,081, filed Sep. 29, 2003 now U.S. Pat. No. 7,996,645.

I. FIELD OF THE INVENTION

The present invention relates to hard disk drives.

II. BACKGROUND OF THE INVENTION

In current hard disk drives, data is written in concentric circular tracks by a magnetic recording head which is positioned above a spinning disk. The magnetic recording head consists of a write head element which is used during writing, and a read head element which is used during reading. During writing, the position of the magnetic recording head above the disk is precisely controlled by a servomechanical feedback loop so that the written data tracks do not overlap. The width of each track is determined by the width of the write head element. The center-to-center spacing of each track (also known as the track pitch) is slightly larger than the track width, and is determined by the servomechanical control system which keeps the head properly positioned above the disk. Each track is separated from its neighbor by a guard band whose width is equal to the track pitch minus the track width. During read back, the read back element in the recording head is precisely positioned above a single track. The width of the read back element is usually equal to or smaller than the width of a written track, so that the read head element detects the signal from only that single track and not from neighboring tracks.

With current hard disk drives, each track may be randomly written at any time without disturbing the data on any of the other tracks. This ability to randomly access the data on the surface of the disk is an important characteristic of hard disk drives which is not shared by all data storage systems.

In U.S. Pat. No. 6,185,063, incorporated herein by reference, a method of writing tracks in partially overlapping fashion is described. This overlapping writing fashion can be referred to as "shingled track writing". Specifically, with shingled track writing, data tracks are written such that each written track partially overlaps an immediately adjacent track that is contiguous to it, like shingles on a tiled roof. Thus, a first track is partially overwritten when a second track contiguous to the first is written, which in turn is partially overwritten when a third track contiguous to the second is written, and so on.

As recognized herein, unlike the conventional approach described above, the write head width advantageously can be significantly larger than the track pitch in shingled track writing, whereas the width of the read back head element can be slightly less than the track pitch so the read back head still detects signal from only a single track and not from neighboring tracks.

The present invention recognizes that although, for reasons discussed more fully below, shingled writing can result in higher data storage density, it may not allow for random access writes to any arbitrary track, because to rewrite one track it may also be necessary to overwrite some of the information stored on subsequent adjacent tracks. The present invention recognizes that it is possible to update data on a track using a multi-step process, in which the data from neighboring tracks is copied elsewhere, the desired track rewritten, and then neighboring tracks are restored to their original state. However, it is no longer possible to update the data on any arbitrary track in a single step, and so some of the random access properties of the storage mechanism are sacrificed. As critically recognized by the present invention but not the above-referenced patent, a consequence is that a disk drive which uses shingled track writing may require a different kind of file system structure from a conventional hard disk drive.

SUMMARY OF THE INVENTION

A hard disk drive (HDD) includes at least one rotatable disk and at least one write element configured for writing data to the disk, potentially using perpendicular recording principles. Two or more contiguous tracks, which are partially overlapped using shingled writing, constitute a band. The storage area of the HDD can be partitioned into isolated tracks and bands of tracks, where shingled writing is used in each band. A HDD controller controls the write element and uses a segmented log-structured file system where each segment corresponds to a respective band or isolated track.

The log-structured file system can preferably use an error correction code (ECC) block size that is larger than a physical sector size of the disk. A cumulative ECC parity state between successive partial writes of an ECC block is retained.

The preferred non-limiting log-structured file system uses a virtual address table (VAT) to implement shingled track writing. The VAT maps virtual sector locations to actual sector locations. The VAT may be stored on the disk in a location with non-overlapping tracks where random access writes can be performed, and/or in a region with shingled written bands, using a log structured storage approach. The VAT may be accessed by a RAID controller in a RAID system to which the HDD belongs, to remap sectors as required for shingled track writing.

In another aspect, a data storage system includes disk means for storing data and means for writing data to the disk in tracks and bands. Two or more tracks establishes a band, and at least some bands are shingled. Means are provided for controlling the means for writing. The means for controlling uses a log means for establishing a file system.

In still another aspect, a redundant array of independent disks (RAID) system includes a RAID controller and a plurality of hard disk drives. Each disk drive includes at least one storage disk and a drive controller reading data from and writing data to the disk. The drive controller for each disk drive is coupled to the RAID controller. According to present principles, the drive controller for each drive writes data in shingled bands using a log-structured file system.

The details of the present invention, both as to its structure and operation, can best be understood in reference to the accompanying drawings, in which like reference numerals refer to like parts, and in which:

BRIEF DESCRIPTION OF THE DRAWINGS

FIG. 4 is a schematic diagram of the virtual address table (VAT).

DETAILED DESCRIPTION OF THE PREFERRED EMBODIMENT

Figure 1:
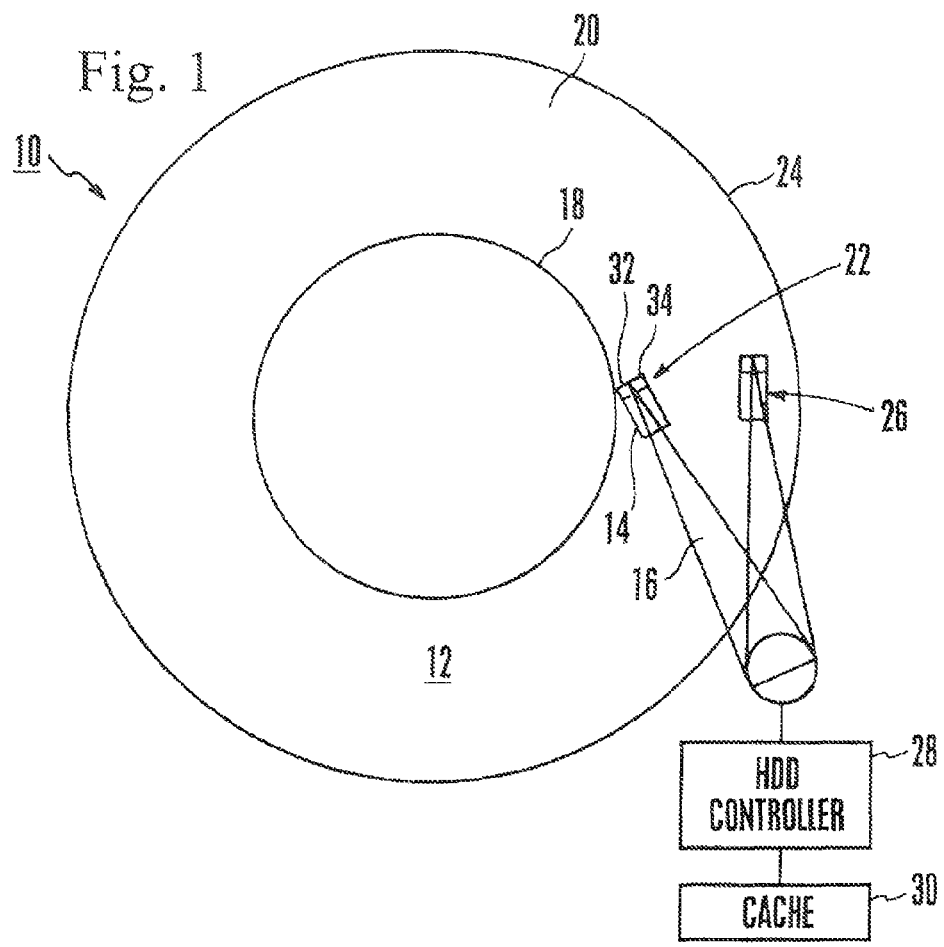
FIG. 1 is a schematic view of the hard disk drive, showing the actuator arm near the inner diameter (ID) and the outer diameter (OD) of the disk.

Referring initially to FIG. 1, a data storage system is shown, generally designated 10, which includes one or more (only one shown for clarity) rotatable hard disks 12 onto which data can be written and from which data can be read by a read/write head 14 that is mounted on an actuator arm 16 for movement of the head 14 over the disk 12 between an inner diameter (ID) 18 of a data storage area 20 of the disk 12 (indicated at position 22 of the head 14) and an outer diameter 24 of the storage area 20 (indicated at position 26 of the head 14). The head 14 and actuator 16 may be controlled by a processor such as a hard disk drive (HDD) controller 28, which executes the below-described shingled writing and file architecture in accordance with present principles. The controller 28 may also access a solid state data cache or buffer 30.

In accordance with HDD principles known in the art and as figuratively shown in FIG. 1, the head 14 may include a write element 32 and a read element 34. The head 14 may be configured for longitudinal recording or for perpendicular recording.

Figure 2:
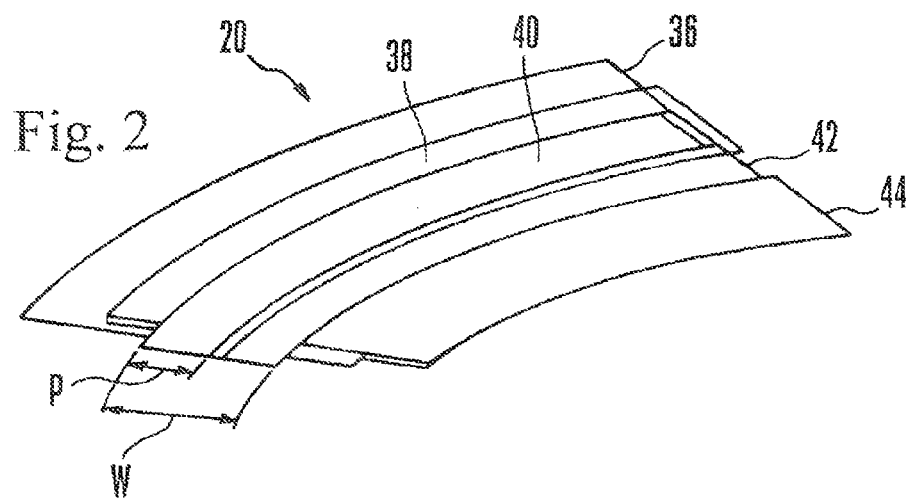
FIG. 2 is a perspective schematic view of the shingled data tracks of the disk, with portions broken away.

As shown in FIG. 2, data is written into the data storage area 20 in shingled fashion. More particularly, a first (in the example shown, outermost) data track 36 is overlapped by a second data track 38 that is immediately adjacent (i.e., contiguous) to the first data track 36, just to the inside of the first track 36, when data is written to the second data track 38. In turn, when data is written to a third data track 40 that is contiguous to the second data track 38, the second data track 38 is overlapped by the third track. Similarly, when data is written to a fourth data track 42 that is contiguous to the third data track 40, the third data track 40 is overlapped by the fourth track. When data is written to a fifth data track 44 that is contiguous to the fourth data track 42, the fourth data track 42 is overlapped by the fifth track. If the fifth track 44 is the last track in a band, it is not overlapped by any other track. It is to be understood that the pattern of overlapping may be reversed, i.e., the first track 36 might overlay, instead of underlay, the second track 38, and so on. While only five data tracks are shown for clarity of disclosure, a band can contain many more data tracks.

In accordance with the present invention, a band is established by at least two contiguous data tracks. In a non-limiting implementation, the data storage area 20 or portion thereof might be subdivided into isolated tracks and bands, with different numbers of tracks in each band, depending on the system requirements. Thus, if high-throughput random access writing is required as might be the case for conventional information technology (IT) data storage applications, isolated tracks may be used to store data, whereas bands containing multiple overlapping tracks may be used when random access writing is less important, as in the case of storing AV files.

As also shown in FIG. 2, the width "W" of the write element 32 shown in FIG. 1 is larger than the track pitch "P" (essentially, the non-overlapped portion of the width of a data track). The width of the read element 34, however, is slightly less than the track pitch P, so that the read element 34 reads only signals from a single track. With the relatively wide write element width "W", the write element 32 can generate higher fields at the disk 12, allowing disk coercivities to increase, grain sizes to decrease, and resulting in increased overall recording density.

A second advantage afforded by the above combination of structure is that the track pitch "P" need not be directly related to the write head width "W" (except for the last track in a band), so that tolerances constraining the write head width "W" can be relaxed.

In the present invention a segmented log-structured file system preferably is implemented in which the data is permanently stored in a log consisting of segments containing indexing information along with the data. Such a system is disclosed in Rosenblum et al., "The Design and Implementation of a Log-Structured File System", paper published by the University of California, Electrical Engineering and Computer Science Division (Berkeley), July 1991, reprinted in *ACM Transactions on Computer Systems*, vol. 10, pp. 26-52 and incorporated herein by reference, although the referenced publication fails to envision shingled track writing and other novel aspects set forth herein. A more detailed reference on log structured file systems can be found in "The Design and Implementation of a Log-Structured File System" (Kluwer International Series in Engineering and Computer Science, 303) by Mendel Rosenblum.

By way of brief review, a segmented log structured file system partitions the storage space into segments, with each segment consisting of a large region of contiguous disk space. As implemented herein, each segment of the log structure is established by a respective one of the above-described bands, wherein a band has two or more data tracks, although in some implementations a small segment may be implemented with a single isolated track or even a portion of a track.

Figure 3:
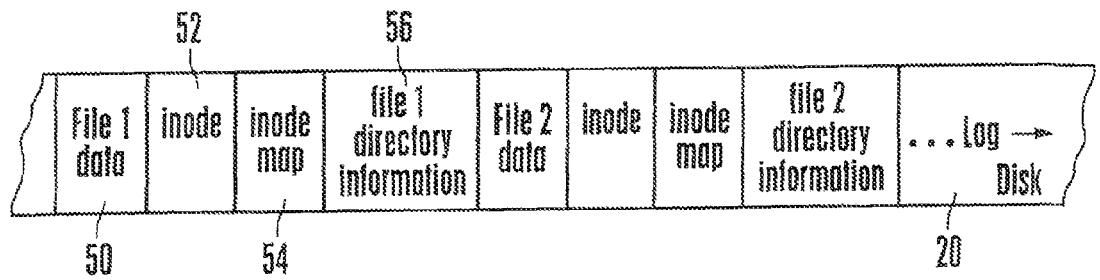
FIG. 3 is schematic diagram of a log-structured file system on a disk.

In reference to FIG. 3, data can be written using streamed writes into a single log structure which spans multiple segments. As the disk space fills up, a garbage collection mechanism runs in the background and cleans out segments which are not fully used, thus freeing up segments to be used for writing new data. The new data added to the log structure is threaded through the old data on a segment by segment basis using clean segments which have been freed up by the garbage collection mechanism.

Using FIG. 3 as an exemplary reference, it being understood that the order of data types and size of data types is for illustration only, each time a file is created or modified (say, "File 1" in FIG. 3), the new data are written to the end of the log, including data sectors 50, a new inode structure 52 to identify the locations of all of the data blocks in the file, and an inode map 54 which identifies the locations of all of the inodes on the disk. A "directory" information region 56 containing data on the file's directory can also be written to the log. If desired, some additional data structures (not shown) may be written to the log to assist in the garbage collection process, to help, for example, in identifying which segments should be cleaned. These include a segment summary data structure for each segment which includes information about the role of each of the data blocks stored in that segment. Also, a segment usage table may be written to the end of the log to provide information about the amount of active data stored in each segment, so that the garbage collection mechanism can decide which segments to clean next. The file system may also implement a checkpoint region located at a fixed position on the disk (not part of the log structure) which contains some metadata information such as pointers to the most recent written inode map, and the most recently written segment usage table.

In any case, as implemented in the present shingled writing architecture, each band (that represents a segment of the log structure) may be written in a fixed direction, either toward the disk outside diameter (OD) as might be the case for inner bands or toward the disk inside diameter (ID) as might be the case for outer bands, to account for the recording head geometry and the natural head skew relative to the tracks within each band. The last track in each band may be wider than the other tracks in the band.

Also, the physical sector size implemented in the present log structure preferably is equivalent to the standard logical sector size assumed on most IT systems (typically five hundred twelve (512) bytes). This is desired so that single-sector transactions may be immediately written to the log as soon as they are transferred to the hard disk drive.

Advantageously however, large error correction (ECC) block sizes within each segment (band) are implemented by storing the intermediate ECC parity state after each partial write of an ECC block. In this case, the ECC block size spans multiple physical sectors, and because of the larger ECC block size the error correction code is more efficient and able to correct larger defect errors on the disk. The ECC code may be implemented in a number of different ways which are well known to those skilled in the art of designing ECC codes.

The checkpoint region for the presently preferred log structured file system is written to a fixed location on the disk. The checkpoint region is implemented using a ring buffer log structured storage area located within a single shingled written band. Multiple copies of the checkpoint data may be written to enhance data integrity.

It is possible to implement shingled track writing in a way which is completely transparent to the user of the disk drive. This would involve the use of a large virtual address table (VAT) 58, shown in FIG. 4. With this architecture, most of the data would be written into a log structure on the disk. The VAT 58 provides a mapping of each virtual sector location 60 (where the host thinks the sector is located) to actual sector location 62 (where the sector is actually located on the disk). The virtual address table preferably is stored on the disk drive, either in a location with non-overlapping tracks where random access writes could be performed, or in a region with shingled written bands, using a log structured storage approach. The virtual address remapping may be performed by a hard disk drive controller, or by a RAID controller in a RAID system as required for shingled track writing.

While the particular LOG-STRUCTURED FILE SYSTEM FOR DISK DRIVES WITH SHINGLED WRITING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A hard disk drive (HDD) comprising:
   at least one rotatable disk;
   at least one write element configured for writing data to the disk in isolated tracks and in bands, wherein at least two tracks establish a band; and
   at least one HDD controller controlling the write element, the controller using a log-structured file system defining segments, at least one segment corresponding to a respective band, wherein the log-structured file system uses an error correction code (ECC) block size larger than a physical sector size of the disk, wherein tracks within a band are shingled.

2. The HDD of claim 1, wherein at least some bands include at least three contiguous tracks.

3. The HDD of claim 1, wherein the write element is configured for perpendicular recording.

4. A hard disk drive (HDD) comprising:
   at least one rotatable disk;
   at least one write element configured for writing data to the disk in isolated tracks and in bands, wherein at least two tracks establish a band; and
   at least one HDD controller controlling the write element, the controller using a log-structured file system defining segments, at least one segment corresponding to a respective band, wherein the log-structured file system uses an error correction code (ECC) block size larger than a physical sector size of the disk, wherein the log-structured file system uses a virtual address table (VAT) to implement shingled track writing.

5. The HDD of claim 4, wherein the VAT maps virtual sector locations to actual sector locations.

6. The HDD of claim 4, wherein the VAT is stored on the disk in at least one of: a location with non-overlapping tracks where random access writes can be performed, and a region with shingled written bands, using a log structured storage approach.

7. The HDD of claim 4, wherein the HDD is part of a RAID system including a RAID controller, the RAID controller accessing the VAT to remap sectors as required for shingled track writing.

8. A hard disk drive (HDD) comprising:
   at least one rotatable disk;
   at least one write element configured for writing data to the disk in isolated tracks and in bands, wherein at least two tracks establish a band; and
   at least one HDD controller controlling the write element, the controller using a log-structured file system defining segments, each segment corresponding to at least one of: a respective band, and an isolated track, wherein the tracks within a band are shingled.

9. The HDD of claim 8, wherein the log-structured file system uses an error correction code (ECC) block size larger than a physical sector size of the disk.

10. The HDD of claim 8, wherein at least some bands include at least three contiguous tracks.

11. The HDD of claim 8, wherein the write element is configured for perpendicular recording.

12. The HDD of claim 8, wherein the log-structured file system uses a virtual address table (VAT) to implement shingled track writing.

13. The HDD of claim 12, wherein the VAT maps virtual sector locations to actual sector locations.

14. The HDD of claim 12, wherein the VAT is stored on the disk in at least one of: a location with non-overlapping tracks where random access writes can be performed, and a region with shingled written bands, using a log structured storage approach.

15. The HDD of claim 12, wherein the HDD is part of a RAID system including a RAID controller, the RAID controller accessing the VAT to remap sectors as required for shingled track writing.

16. A hard disk drive (HDD) comprising:
   at least one rotatable disk;
   at least one write element configured for writing data to the disk in isolated tracks and in bands, wherein at least two tracks establish a band; and
   at least one HDD controller controlling the write element, the controller using a log-structured file system defining segments, each segment corresponding to at least one of: a respective band, and an isolated track, wherein the log-structured file system uses a virtual address table (VAT) to implement shingled track writing.

17. The HDD of claim 16, wherein the tracks within a band are shingled.

18. The HDD of claim 16, wherein the log-structured file system uses an error correction code (ECC) block size larger than a physical sector size of the disk.

19. The HDD of claim 16, wherein at least some bands include at least three contiguous tracks.

20. The HDD of claim 16, wherein the write element is configured for perpendicular recording.

21. The HDD of 16, wherein the VAT maps virtual sector locations to actual sector locations.

22. The HDD of claim 16, wherein the VAT is stored on the disk in at least one of: a location with non-overlapping tracks where random access writes can be performed, and a region with shingled written bands, using a log structured storage approach.

23. The HDD of claim 16, wherein the HDD is part of a RAID system including a RAID controller, the RAID controller accessing the VAT to remap sectors as required for shingled track writing.

* * * * *